Patented Oct. 13, 1925.

1,557,053

UNITED STATES PATENT OFFICE.

CHARLES W. HOOPER, OF JAMAICA, NEW YORK.

FOOD PRODUCT.

No Drawing. Application filed December 10, 1923. Serial No. 679,779.

*To all whom it may concern:*

Be it known that I, CHARLES W. HOOPER, a citizen of the United States, and resident of Jamaica, county of Queens, and State of New York, have invented certain new and useful Improvements in Food Products, of which the following is a specification.

My invention relates to a new food product and more particularly to a food product adapted for infant feeding.

It has long been known that the human diet should contain balanced proportions of protein, fat, carbohydrate and inorganic salts and should conform to certain rather definite requirements as to caloric or fuel value and that an adequate supply should be maintained of three accessory food factors commonly known as vitamins, namely the fat soluble A factor, the water soluble B or antineuritic factor and the water soluble C or antiscorbutic factor. The dietary habits of the greater part of the adult population of the United States are such as to prevent the continuous consumption of food deficient in vitamins. The ordinary mixed diet of meat, fresh vegetables, milk and egg contains adequate amounts of vitamin. Infant feeding, however, presents a difficult problem. In most instances it is essential to boil or pasteurize the milk of bottle babies to prevent infection. The antiscorbutic and antineuritic vitamin content of such milk is relatively low. Furthermore, infants given an exclusive milk diet over a prolonged period tend to develop anæmia. It has been established that the two well known deficiency diseases, scurvy and beriberi are not due to a deficiency of the diet in proteins, carbohydrates or fats, but that certain accessory food substances are lacking in the food. In scurvy the antiscorbutic factor is absent and in beriberi it is the antineuritic factor. Infantile scurvy or Barlow's disease occurs frequently when boiled milk forms the exclusive diet of children. Clinicians realizing these deficiencies have advocated the early use of orange juice, lemon juice or tomato juice, beef juice and spinach or carrot soup in the feeding of bottle or nursing babies.

The use of such foodstuffs for infants, however, has serious disadvantages. Some of them must be fed separately because if mixed with the milk they would curd or coagulate the milk especially when the milk is warmed for the infant. This is particularly true of the fruit or vegetable juices. Some of these accessory foods can not be well tolerated by many infants. None of them have the desirable blood building value. Most of them are not stable and must be most carefully prepared fresh daily entailing much labor with considerable variability of the resulting product and uncertainty as to its purity and value.

An infant food product has therefore long been sought which contains the desirable vitamin proportions as above pointed out, to cure and prevent neutritional deficiency diseases of infancy, which is readily miscible with the baby's milk leaving the ingredients thoroughly distributed therein, which does not curd or coagulate the milk and which is capable of being readily assimilated by infants generally without material trouble. While a very large number of food products have long been known which separately possessed one or another of the vitamin factors respectively, no one, so far as I am aware, has been able to discover an infant food mixture having these various important vitamin factors in proper proportions and which mixture was stable and the ingredients did not materially react on one another while being kept sealed under ordinary conditions, and which mixture was readily miscible with liquid milk or water leaving all parts thoroughly distributed therein, and which did not curd or coagulate the milk. My new food product has all these advantageous characteristics and properties and the further advantage that it may be prepared in convenient form, is relatively inexpensive and its vitamin factors, caloric value and food value are easily standardized.

A food product to supplement the food deficiencies of milk and other baby foods should meet the most rigid requirements. It should be so constructed as to supply adequate amounts of all three of the accessory foodstuffs, the fat soluble A, the antineuritic and antiscorbutic vitamins, the necessary inorganic salts, blood building substances, and substances which tend to prevent rickets and tetany. It should increase the caloric value of diluted milk. It should be well tolerated and easily metabolized, and should be so balanced as to offset the intestinal intoxications and disorders of infancy associated with a strongly putrefactive intestinal flora. It is generally known that infants fed on a diet rich in bovine milk acquire a characteristic stool flora which in contrast to that of the nursling is putrefactive in its activities and which gives rise to the formation of the undesired protein split products—histamine, cholin, indol, phenol, skatol, etc. It should be prepared under aseptic conditions and so simply constructed that the mother can handle it with reasonable safety in the preparation of bottle milk. Finally, it should make unnecessary the expensive time consuming and difficult preparation of fruit, vegetable and meat juices, so perplexing to the average mother or caretaker.

So far as I am aware no one has been able to make a product meeting these requirements from those food elements which have been accepted as suitable for infant feeding and it has only been after many years of experimental study that I have discovered my new food product which meets these requirements.

My invention in its preferred form comprises a mixture containing powdered desiccated animal liver, specially prepared fruit or vegetable juice and carbohydrate material or powdered dry milk. By the term vegetable juice I include fruit juices and the same may be either neutralized or left unneutralized although the neutralized juice is preferred, likewise other powdered desiccated meat may be used in place of or in addition to the liver and more or less of the advantages of my invention obtained, but the use of liver is far preferable.

One would ordinarily expect that animal liver or meat would be totally unsuited as an ingredient in such a food product. Ordinary desiccated comminuted animal liver alone is not easily miscible with milk; it does not remain satisfactorily in suspension therein but settles out rapidly to the bottom of the container. The particles do not readily pass through the ordinary bottle nipple used in infant feeding. I have discovered however, that when it is very finely divided or powered and when added with the other ingredient or ingredients as hereinafter pointed out, if it is then stirred into milk it goes into suspension immediately and does not settle out rapidly and the particles are so small that they readily pass through the ordinary bottle nipple. Furthermore ordinary desiccated liver is not readily assimilated by babies generally and attempts to feed it to babies have generally proved disastrous. I have discovered, however, that when administered in my improved food mixture these disadvantages are overcome. These discoveries enable me to use animal liver which contains more of the antineuritic vitamin and fat soluble A vitamin than any other animal tissue. It has been shown that liver contains adequate protein to maintain normal growth in rats. It has also been shown that liver contains a greater amount of blood building substances than beef or beef heart. Furthermore, it has been found that liver feeding protects against acetonitrile, propionitrile, and chloroform poisoning and that it prevents the intestinal intoxication and the anæmia which occur when the bile is excluded from the intestinal tract. The liver is the warehouse of the inorganic salts of the body. It contains phosphoric acid, potassium, sodium, alkaline earths, and chlorine. Iron calcium and magnesium are also plentiful. Animal liver oil is regarded by many as a specific in the treatment of rickets, and it is also regarded as beneficial in the treatment of tetany. This value is retained in the desiccated animal liver. Therefore, I prefer to use animal liver but other meat products may be used with more or less success.

While it is well known that orange juice and other fruit and vegetable juices possess the antiscorbutic vitamin in marked concentration and also the antineuritic vitamin and fat soluble A vitamin in appreciable amounts, it has been considered impracticable to use these in a food mixture of the class in question because they are either likely to curd or coagulate the milk, or are unstable or react on the other ingredients to deleteriously affect the food value of the mixture, or all three. Orange juice powder is ordinarily very hygroscopic, readily absorbing moisture from the air and forming a hard cake which is dissolved in milk or water only with great difficulty. I have discovered, however, that when mixed with other ingredients as hereinafter pointed out the mixture does ont cake but retains the consistency of fine powder, readily miscible with water, milk, soups, etc., and when the juice powder is specially prepared the other disadvantages may be overcome.

I find that my food mixture is stable when placed in tightly sealed glass containers and apparently does not deteriorate with age. The attainment of this property has required exhaustive experimentation with numerous food ingredients and has been a constant source of anxiety in the development of a practical product for the purposes in question. The antiscorbutic vitamin is a labile substance and is very easily destroyed. I have descovered, however. that it keeps admirably when mixed with the other ingredients of my mixture, although with some ingredients which one skilled in the art might suggest, it rapidly deteriorates.

My new product in its preferred form when mixed with milk, or dried milk in correct proportions with water, constitutes a complete food for the baby. I find that it is well tolerated by infants in the first weeks of life. Babies given this supplementary food during the entire first year have developed normally and have shown excellent vitality. It contains no pathogenic bacteria and may be added directly to the liquid food of bottle fed babies after it has been prepared without the risk of infecting the infant or destroying its antiscorbutic vitamin content by heat. So far as I am aware no food mixture having these properties and the desirable vitamin factors in proper proportions, has hitherto been produced. With my product also the proper amount to be used may be measured quite accurately with a spoon. It contains definite amounts of antiscorbutic vitamin, the antineuritic vitamin and blood building substance so that the physcian may prescribe it accurately. It is stable and apparently does not deteriorate with age. It furnishes a constant source of supply and may be utilized without material waste.

In preparing my new food product in its preferred form the following procedure may be followed—

(a) Powdered desiccated animal liver. Animal liver taken from animals free from disease is used. After the liver is entirely cooled from animal heat it is thoroughly washed in clean water at room temperature. The liver pulp is then carefully dissected away from the bile ducts and blood vessels and cut up in pieces of from 2 to 3 inches in diameter. The pieces are boiled or steamed in clean water in porcelain lined metal vessels until the protein is thoroughly coagulated, which will require from one-half to three-quarters of an hour. When the liver has been thus treated and allowed to cool slightly it is ground in a meat hasher to a finely granulated mass. This mass is then spread about one inch thick in galvanized metallic drying pans and placed in a vacuum dryer or a well ventilated exhaust air dryer and thoroughly desiccated at a temperature not to exceed from 45° to 60° C. for a time ranging from 2 to 5 hours. When the mass becomes thoroughly dry the pans are removed from the dryer. The desiccated liver is then allowed to cool and is ground to a very fine powder. The finer particles from 1/1000 to 1/100 of an inch in diameter are carefully separated from the coarser particles by sieving through a very fine mesh sieve. Only the finer particles are used in the preparation of the baby foods.

(b) Neutralized orange juice powder. Ripe oranges are used. The juice is squeezed by means of metallic machinery into porcelain lined metal vessels. To the juice is added a sufficient amount of precipitated calcium carbonate to neutralize from 85 per cent to 95 per cent of the acid. The yellow precipitate of calcium citrate is removed by straining through several thicknesses of gauze. The neutralized juice is then dried by sending it through a spray machine held at an elevated temperature. The neutralized orange juice powder is then collected and stored in sterile and tightly sealed containers. The object in neutralizing the greater part of the acid contained in the orange juice is to obtain an orange juice powder which when dissolved in milk will not cause the milk to curd or coagulate. The antiscorbutic vitamin content of the neutralized orange juice powder is determined by means of animal experiments. The amount of the neutralized orange juice powder incorporated into the baby food supplement depends entirely upon the amount of the antiscorbutic vitamin contained in the powder.

(c) Carbohydrate. Glucose.

The ingredients of the baby food are preferably combined in the following manner.

The powdered desiccated animal liver, neutralized orange juice powder and glucose are thoroughly mixed together, passed through a fine mesh sieve, and stored in sterile and tightly sealed glass containers. The final product, the baby food supplement, is combined so that 100 grams of the product contains an amount of neutralized orange juice powder equal in its antiscorbutic vitamin content to 100 grams of fresh orange juice. By clinical experimentation I have found that for infants under one year of age the amount of powdered desiccated animal liver contained in 100 grams of the final product should not represent more than 50 grams of fresh animal liver, and for infants over one year of age the amount of powdered desiccated animal liver may represent as much as 100 grams of fresh liver.

A specific example stating the quantities of material used in the baby food supplement for infants under one year of age is given as follows:

(1) The amount of neutralized orange juice powder which is equal in its antiscorbutic vitamin content to 100 grams of fresh orange juice. The amount required may vary from 29 to 35 grams.

(2) The amount of powdered desiccated animal liver which represents 50 grams of the fresh liver from which the powdered desiccated animal liver was prepared. The amount required may vary from 13 to 19 grams.

(3) Glucose, a sufficient quantity to make 100 grams.

A specific example stating the quantities of material used in the baby food supplement for infants over one year of age is given as follows:

(1) The amount of neutralized orange juice powder which is equal in its antiscorbutic vitamin content to 100 grams of fresh orange juice.

(2) The amount of powdered desiccated animal liver which represents 100 grams of the fresh animal liver from which the powdered desiccated animal liver was prepared. The amount may vary from 26 to 38 grams.

(3) Glucose, a sufficient quantity to make 100 grams.

The final product has the consistency of fine talcum powder and is readily miscible with water, milk, soups, etc. When stirred into milk it goes into suspension immediately. The particles of desiccated liver in the suspension are so small that they readily pass through the ordinary bottle nipple used in feeding infants.

In order to retain the antiscorbutic vitamin which would be destroyed by excessive heating used by many mothers and nurses in the preparation of food for babies, the food product is prepared under aseptic conditions and is stored in sterile containers so that it may be added to the liquid baby food just before feeding.

In some cases it may be desirable to use this food product as a supplement to dry powdered milk instead of adding it directly to the ordinary liquid milk. One part by weight of the mixture in powdered form as above described may be mixed with 9 parts by weight of the milk powder of any well known or suitable variety forming a mixture embodying my improvements, and this mixture may be added to water with or without some liquid milk, to produce the final food product, all of which is intended to be covered by the appended claims. When using a mixture containing the milk powder with the vegetable juice powder one or more of the other ingredients may be omitted as the milk powder may serve to a certain extent as a substitute therefor. In such case the milk powder and vegetable juice powder coact and cooperate with one another, in that the vegetable juice powder being relatively hygroscopic and the milk powder being relatively much less hygroscopic, the latter tends to keep the former dry in the mixture so that the mixture as a whole is very little hygroscopic and will absorb practically no moisture from the air, and by reason of this coaction the setting up of bacterial action or decomposition in the mixture and particularly in the juice powder is substantially prevented. The inclusion of some of the infant food carbohydrate also further tends to prevent bacterial action or decomposition in the same way.

The invention may also be embodied in liquid form before the addition of any milk by taking the first described mixture and adding thereto and thoroughly mixing therewith clean water or distilled water, and this liquid form may be added to infant's bottle milk. In carrying out the invention in this form I preferably thoroughly mix powdered desiccated animal liver, concentrated fruit or vegetable juice and carbohydrate containing materials, and dilute said mixture with water so that the final product, the baby food supplement, contains the amount of concentrated fruit or vegetable juice which is equal in its antiscorbutic vitamin content to a like volume of fresh orange juice, and in each 100 c. c. of the final product, the amount of powdered desiccated animal liver which represents from 50 grams to 100 grams of the fresh liver from which the powdered desiccated animal liver was prepared.

Although orange juice has been named specifically as the source of antiscorbutic vitamin in the preparation of the baby food supplement I do not confine myself to this source alone, as other fruit or vegetable juices rich in antiscorbutic vitamin may be used instead of orange juice, or in combination with orange juice.

And, desiccated or concentrated orange juice or other fruit or vegetable juices prepared by any of the known methods for desiccating or concentrating orange juice or other fruit or vegetable juices, which do not destroy the vitamin content, may be used in the preparation of the baby food supplement instead of the concentrated orange juice prepared by the above described process. In the claims the expression "vegetable juice" has been used to designate either fruit juice or vegetable juices or mixtures thereof.

Instead of the carbohydrate, glucose, prescribed in the above preparation of the baby food supplement, analogous carbohydrates may be used, such as maltose, saccharose, etc., or carbohydrate syrups, such as corn syrup, etc. which will serve the like purpose of increasing the food value and of maintaining the sterility of the product, and which may have a slightly laxative effect when administered to infants. Any of the class of infant food carbohydrates may be used, including (1) the hexoses of the monosaccharides, (2) practically all the disaccharides and (3) the dextrins, or mixtures thereof.

If desired yeast or analogous products such as autolized yeast or concentrated yeast extracts may be used in the preparation of the baby food product to further aid to its antineuritic vitamin content.

The yeast or analogous product should be added in proportion to the amount of the antineuritic vitamin contained in the product used as the amount of antineuritic vitamin contained in yeast or analogous products may vary over a wide range.

A specific example stating the quantities of material used in the food when powdered desiccated autolized yeast is used as an ingredient is given as follows:

(1) The amount of desiccated autolized yeast which is equal in its antineuritic vitamin content to 15 grams of desiccated brewer's yeast obtained from fresh cultures.

(2) The amount of neutralized orange juice powder which is equal in its antiscorbutic vitamin content to 100 grams of fresh orange juice.

(3) The amount of powdered desiccated animal liver which represents 100 grams of the fresh animal liver from which the powdered desiccated animal liver was prepared.

(4) Glucose, a sufficient quantity to make 100 grams.

While I have described my improvements in great detail and with respect to preferred forms, I do not desire to be limited to such details or forms since many changes and modifications may be made and the invention embodied in other forms without departing from the spirit and scope thereof in its broader aspects. I therefore desire to cover all forms and modifications coming within the language or scope of any one or more of the appended claims.

What I claim as new and desire to secure by Letters Patent, is:

1. The new food product comprising a mixture of food ingredients, one ingredient being animal liver in finely divided condition, another being vegetable juice and another infant food carbohydrate, the mixture having the following characteristics and properties; the mixture is stable and the ingredients therein do not materially react upon one another to change their food value while being kept sealed under ordinary conditions, the mixture is readily miscible with liquid milk leaving the ingredients thoroughly distributed throughout the milk and the mixture does not curd or coagulate the milk, and all the ingredients of the mixture are capable of being assimilated by infants generally without material trouble.

2. The new food product comprising a mixture containing in substantial quantities, animal meat in finely divided condition, vegetable juice and an infant food carbohydrate, the mixture having the following characteristics and properties; the mixture is stable and the ingredients therein do not materially react upon one another to change their food value while being kept sealed under ordinary conditions, the mixture is readily miscible with liquid milk or water leaving the meat in suspension therein and it does not curd or coagulate the milk.

3. The new food product comprising a dry, finely divided mixture containing powdered desiccated animal liver and fruit juice powder, the mixture having the following characteristics; the mixture is stable and the ingredients therein do not materially react upon one another to change their food value while being kept sealed under ordinary conditions, the mixture is readily miscible with liquid milk leaving the ingredients thoroughly distributed throughout the milk and the mixture does not curd or coagulate the milk, and all the ingredients of the mixture are capable of being assimilated by infants generally without material trouble.

4. The new food product comprising a dry mixture containing from 29 to 35 parts by weight of neutralized vegetable juice powder, from 13 to 38 parts by weight of powdered desiccated animal liver and glucose sufficient to make approximately 100 parts by weight, the mixture is stable and the ingredients therein do not materially react upon one another to change their food value while being kept sealed under ordinary conditions, the mixture is readily miscible with liquid milk leaving the ingredients thoroughly distributed throughout the milk and the mixture does not curd or coagulate the milk, and all the ingredients of the mixture are capable of being assimilated by infants generally without material trouble.

5. The new food product comprising a dry mixture of food ingredients, one ingredient being finely divided liver, another being desiccated vegetable juice, and another being dry powdered milk, the mixture having the following characteristics and properties; the mixture is stable and the ingredients do not materially react on one another to change their food value while being kept sealed under ordinary conditions, the mixture is readily miscible with water leaving the ingredients thoroughly distributed therethroughout, the ingredients do not curd or coagulate the milk when so mixed with water and all the ingredients are capable of being assimilated by infants generally without material trouble.

6. The new food product comprising a dry mixture of food ingredients, one ingredient being finely divided desiccated animal liver, another being desiccated fruit juice, another being a finely divided infant food carbohydrate and another being dry powdered milk, the mixture having the following characteristics and properties; the mixture is stable and the ingredients do not materially react on one another to change their food value while being kept sealed under ordinary conditions, the mixture is readily miscible with water leaving the ingredients thoroughly distributed therethroughout, the ingredients do not curd or coagulate the milk when so mixed with water and all the ingredients are capable of being assimilated by infants generally without material trouble.

7. The new food product comprising a dry mixture of food ingredients, one ingredient being finely divided desiccated meat, another being desiccated vegetable juice and another dry powdered milk, the mixture having the following characteristics and properties; the mixture is stable and the ingredients do not materially react on one another to change their food value while being kept sealed under ordinary conditions, the mixture is readily miscible with water leaving the ingredients thoroughly distributed therethroughout, the ingredients do not curd or coagulate the milk when so mixed with water and all the ingredients are capable of being assimilated by infants generally without material trouble.

In testimony whereof I have signed my name to this specification.

CHARLES W. HOOPER.